(12) United States Patent
Shimaguchi

(10) Patent No.: US 6,856,880 B2
(45) Date of Patent: Feb. 15, 2005

(54) AUTOMATIC SHIFT CONTROLLER FOR A VEHICLE

(75) Inventor: Hiromichi Shimaguchi, Shizuoka-ken (JP)

(73) Assignee: Suzuki Motor Corporation, Shizuoka-ken (JP)

(*) Notice: Subject to any disclaimer, the term of this patent is extended or adjusted under 35 U.S.C. 154(b) by 0 days.

(21) Appl. No.: 10/397,980

(22) Filed: Mar. 26, 2003

(65) Prior Publication Data

US 2003/0187561 A1 Oct. 2, 2003

(30) Foreign Application Priority Data

Mar. 27, 2002 (JP) ........................................ 2002-088404

(51) Int. Cl.[7] .............................................. F16H 3/091
(52) U.S. Cl. ............................ 701/51; 701/67; 477/34; 477/70; 477/79; 477/166; 74/330; 74/335
(58) Field of Search ................................ 701/51, 62, 65, 701/66, 67; 74/330, 331, 333, 335; 477/34, 70, 79, 86, 166, 174

(56) References Cited

U.S. PATENT DOCUMENTS

| | | | | |
|---|---|---|---|---|
| 4,538,475 A | * | 9/1985 | Igarashi et al. ............... | 74/368 |
| 4,971,183 A | * | 11/1990 | Tellert ......................... | 477/86 |
| 6,044,719 A | | 4/2000 | Reed, Jr. et al. | |
| 6,397,994 B1 | * | 6/2002 | Bowen ....................... | 192/48.9 |
| 6,494,110 B2 | | 12/2002 | Hatakeyama | |
| 6,688,288 B1 | * | 2/2004 | Houston et al. ............. | 123/456 |
| 6,712,734 B1 | * | 3/2004 | Loeffler ......................... | 477/5 |
| 2001/0013258 A1 | | 8/2001 | Kobayashi | |
| 2002/0050259 A1 | * | 5/2002 | Kojima ..................... | 123/179.3 |
| 2002/0153208 A1 | * | 10/2002 | Koga .......................... | 188/31 |

FOREIGN PATENT DOCUMENTS

| | | |
|---|---|---|
| JP | 05-248527 | 9/1993 |
| JP | 05-96617 U | 12/1993 |
| JP | 06-201027 | 7/1994 |
| JP | 2703169 B2 | 10/1997 |
| JP | 3011567 B2 | 12/1999 |
| JP | 2000-097297 | 4/2000 |
| JP | 2001-227599 | 8/2001 |
| JP | 2001-227600 | 8/2001 |
| JP | 2001-280495 | 10/2001 |
| JP | 2001-289288 | 10/2001 |

* cited by examiner

*Primary Examiner*—Michael J. Zanelli
*Assistant Examiner*—Eric M. Gibson
(74) *Attorney, Agent, or Firm*—Flynn, Thiel, Boutell & Tanis, P.C.

(57) ABSTRACT

An automatic shift controller for a vehicle which controls a gear-shifting mechanism to engage one of several gear trains. A sub-clutch connects and disconnects so that one of the gear trains, other than a first-speed gear train and a reverse gear train, is engaged or disengaged. By use of a controller, 1) when the vehicle is parked, then the reverse gear is engaged, the main clutch is engaged, and the sub-clutch is disengaged, and 2) when preparation for engine start-up is started in a state wherein the vehicle is parked, then the main clutch is disengaged and the sub-clutch is engaged.

8 Claims, 6 Drawing Sheets

FIG.3

| STATUS | AUTOMATIC TM OF THE PRESENT INVENTION | |
|---|---|---|
| | OPERATION | PARKING STATE |
| SHIFT: "P" ENGINE: STOPPED KEY: NOT INSERTED BRAKE: OFF | REVERSE GEAR ENGAGED SUB-CLUTCH DISENGAGED MAIN CLUTCH ENGAGED | LOCKED |
| KEY: INSERTED (OR DOOR OPENED) | SUB-CLUTCH ENGAGED MAIN CLUTCH DISENGAGED | |
| BRAKE: ON | ↑ | |
| ENGINE: STARTED | ↑ MOVABLE WHEN BRAKE: OFF | |
| SHIFT: "R" | SUB-CLUTCH DISENGAGED | CANCELLED |
| SHIFT: "N" | ALL GEARS DISENGAGED MAIN CLUTCH ENGAGED | |
| NORMAL DRIVING | | |
| SHIFT: "N" | ALL GEARS NOT ENGAGED MAIN CLUTCH DISENGAGED | CANCELLED |
| SHIFT: "R" | REVERSE GEAR ENGAGED MAIN CLUTCH DISENGAGED | |
| SHIFT: "P" | SUB-CLUTCH ENGAGED | LOCKED |
| ENGINE: STOPPED | ↑ | |
| BRAKE: OFF | ↑ | |
| KEY: REMOVED | SUB-CLUTCH DISENGAGED MAIN CLUTCH ENGAGED | |

FIG.6

| STATUS | CONVENTIONAL WITH TORQUE CONVERTER | | CONVENTIONAL AUTOMATIC MT | |
|---|---|---|---|---|
| | OPERATION | PARKING STATE | OPERATION | PARKING STATE |
| SHIFT: "P" ENGINE: STOPPED KEY: NOT INSERTED BRAKE: OFF | PARKING MECHANISM IN OPERATION | LOCKED | REVERSE GEAR ENGAGED MAIN CLUTCH ENGAGED | LOCKED |
| KEY: INSERTED (OR DOOR OPENED) | ↑ | | ↑ | |
| BRAKE: ON | ↑ | | MAIN CLUTCH DISENGAGED | |
| ENGINE: STARTED | MOVABLE WHEN BRAKE: OFF | | ↑ | |
| SHIFT: "R" | PARKING MECHANISM NOT IN OPERATION | CAN-CELLED | ↑ | CAN-CELLED |
| SHIFT: "N" | ↑ | | ALL GEARS NOT ENGAGED MAIN CLUTCH ENGAGED | |
| | NORMAL DRIVING | | | |
| SHIFT: "N" | ↑ | CAN-CELLED | ALL GEARS NOT ENGAGED MAIN CLUTCH ENGAGED | CAN-CELLED |
| SHIFT: "R" | ↑ | | REVERSE GEAR ENGAGED MAIN CLUTCH DISENGAGED | |
| SHIFT: "P" | PARKING MECHANISM IN OPERATION | LOCKED | ↑ | LOCKED |
| ENGINE: STOPPED | ↑ | | ↑ | |
| BRAKE: OFF | ↑ | | MAIN CLUTCH ENGAGED | |
| KEY: NOT INSERTED | ↑ | | ↑ | |

PRIOR ART

PRIOR ART

AUTOMATIC SHIFT CONTROLLER FOR A VEHICLE

FIELD OF THE INVENTION

This invention relates to an automatic shift controller for a vehicle, and more particularly to an automatic shift controller for a vehicle in which the vehicle can be in a parking state (stopped) without a special parking mechanism even during preparation for start-up of an engine.

BACKGROUND OF THE INVENTION

In vehicles, a transmission is equipped for converting the power from the engine according to the driving state of the vehicle. As a transmission, there are a manual transmission to manually change gear engagement, and an automatic transmission to automatically change engagement according to the driving state of the vehicle.

The manual transmission is equipped with a plurality of gear trains and gear-shifting mechanisms for the gear trains. The gear-shifting mechanism is manually operated so that one of the gear trains is engaged. In contrast, the automatic transmission is typically equipped with a torque converter and an auxiliary transmission. An actuator switches the engagement of the auxiliary transmission based on the position of a shift lever.

In addition, there exists an automatic transmission based on the manual transmission having gear trains and gear-shifting mechanisms so as to change the gears automatically. FIG. 7 shows such automatic transmission, where reference numeral 302 designates an engine and 304 an automatic transmission.

The automatic transmission 304 comprises an input shaft 310 connected to a crankshaft 306 of the engine 302 on the vehicle (not shown) through a main clutch 308, an output shaft 312 connected to a drive wheel (not shown), and first through fifth speed gear trains 314, 316, 318, 320, 322 and a reverse gear train 324. The gears transmit the driving power from the input shaft 310 to the output shaft 312 at different ratios.

The gear trains 314, 316, 318, 320, 322 and 324 are changed by the gear-shifting mechanism. The gear-shifting mechanism of the automatic transmission 304 includes a first-to-second shifting mechanism 326, a third-to-fourth shifting mechanism 328, a fifth speed shifting mechanism 330, and a reverse shifting mechanism 332. Reference numeral 334 designates a final reduction gear train, 336 a differential gear, and 338 a driving shaft in connection with a drive wheel (not shown).

In the automatic transmission 304, an automatic shift controller (not shown) switches the gear engagement automatically. The automatic shift controller controls an actuator (not shown) to operate the gear-shifting mechanisms 326, 328, 330, and 332 so that one of the gear trains 314, 316, 318, 320, 322 and 324 is engaged according to the position of a shift lever (not shown).

Examples of the controllers are disclosed in JP Laid-Open No. 2001-227600 and JP No. 2000-97297 Official Gazettes.

The controller disclosed in JP Laid-Open No. 2001-227600 comprises: an input shaft; a main clutch to transmit driving power of the engine to the input shaft; a counter shaft to which the driving power from the input shaft is transmitted through the gears; an output shaft to transmit the driving power to a rear differential, which shaft is disposed on an axis in a direction of the input shaft; an intermediate shaft on an axis other than the input shaft and the counter shaft; and a sub-clutch on the intermediate shaft. The sub-clutch variably controls the torque transmitted from the input shaft to the output shaft during gear change.

The controller disclosed in JP Laid-Open No. 2000-97297 comprises: a first drive shaft supported in a transmission housing; drive gears rotatably mounted on the first drive shaft; a second drive shaft concentric with the first drive shaft; drive gears rotatably mounted on the second drive shaft; a driven shaft in parallel with the first and second drive shafts; and a driven gear fixed on the driven shaft and in mesh with the corresponding drive gear on the first and second drive gears.

A normal automatic transmission with a torque converter (AT with torque converter) includes a parking mechanism having a parking gear. Referring to FIG. 6, the vehicle of the normal automatic transmission is parked in which the parking mechanism allows the parking gear to be engaged when the shift lever is in a parking position.

In contrast, an automatic transmission based on a manual transmission MT does not have "a parking state" by which the shift lever is in the parking position as in the normal automatic transmission with the torque converter.

This is due to that, as shown in FIG. 6, for the automatic transmission based on the manual transmission (automatic MT), the vehicle is parked, i.e. stopped, while utilizing stop of the engine, or stopping force of the engine, in which the gear train, e.g. reverse gear, and the main clutch are engaged respectively while the engine is stopped as in the manual transmission.

At or after engine start-up, the vehicle with the conventional automatic transmission based on the manual transmission cannot be in the parking state, since the stop of the engine cannot be utilized.

On this account, the conventional automatic transmission based on the manual transmission requires a separate parking mechanism such as a parking gear to achieve and maintain the parking state at or after engine start-up. The parking mechanism should be communicated with the shift lever through select cables for mechanical operation, which results in cost increase.

Also, in starting-up the engine in the parking state with the gears engaged, the engine starts up and at the same time the parking state is cancelled. Therefore, it is required to determine from signals such as a brake signal whether the vehicle is able to move. If it is determined that the vehicle is able to move, the engine is prevented from start-up. On this account, if the time between the determination and the engine start-up operation is not enough, control may not work properly, which results in problem of startability.

SUMMARY OF THE INVENTION

In order to obviate or minimize the above problem, the present invention provides an automatic shift controller for a vehicle. That is, an engine is mounted on the vehicle. An input shaft is connected with the engine through a main clutch and an output shaft is connected with a drive wheel. A plurality of gear trains transmits the driving power from the input shaft to the output shaft at different ratios. A gear-shifting mechanism shifts the gear trains and is controlled by the controller so that one of the gear trains is engaged according to a position of a shift lever. A sub-clutch connects and disconnects so that one of the gear trains, other than a first-speed gear train and a reverse gear train, is engaged or disengaged. A control means controls so that when the vehicle is parked, then the reverse gear is engaged, the main clutch is engaged, and the sub-clutch is disengaged; and so that when preparation for engine start-up is started in a state where the vehicle is parked, then the main clutch is disengaged and the sub-clutch is engaged.

According to the present invention, the sub-clutch engages and disengages so that one of the gear trains, except for the first-speed gear train and the reverse gear train, is engaged or disengaged. When the vehicle is parked, the controller controls so that the reverse gear is engaged, the main clutch is engaged, and the sub-clutch is disengaged. Therefore, the vehicle can be in the parking state by a "mechanical parking mechanism" which utilizes the stop of the engine with the engagement of the main clutch and the reverse gear train respectively, which does not require electric power, as in the automatic transmission based on the conventional manual transmission.

In addition, when the engine is preparing for start-up in a state in which the vehicle is parked, the controller controls so that the main clutch is disengaged and the sub-clutch is engaged. Therefore, the vehicle can be maintained in the parking state by the engagement of the sub-clutch during preparation for engine start-up.

BRIEF DESCRIPTION OF THE DRAWINGS

FIG. 3 is a flowchart showing operation of the automatic shift controller for the vehicle in the parking state through the engine start-up to the vehicle running state.

FIG. 6 is a flowchart showing operation of a conventional automatic shift controller, from the vehicle in the parking state through the engine start-up to the vehicle running state.

DETAILED DESCRIPTION OF THE INVENTION

Figure 1:
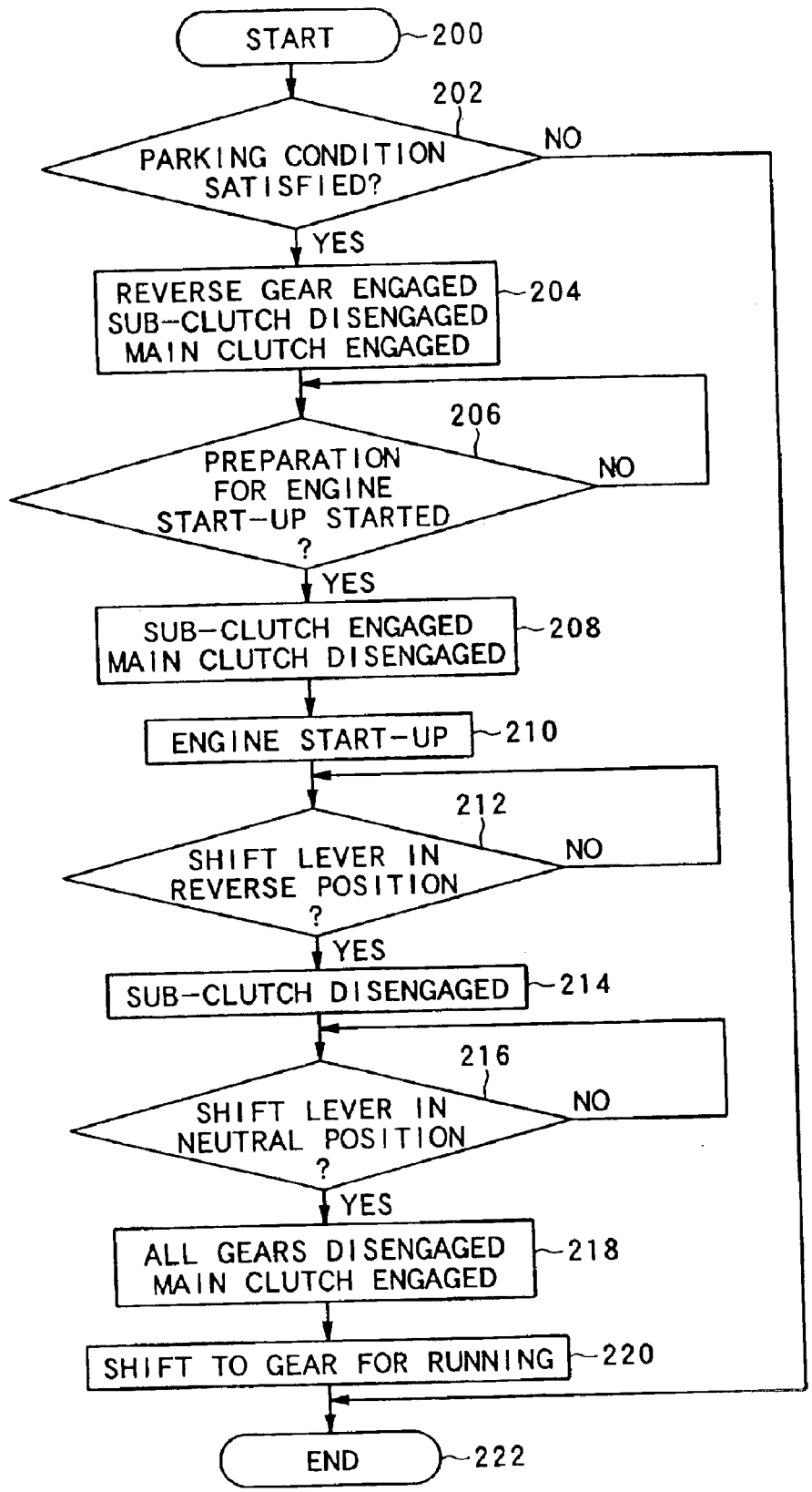
FIG. 1 is a flowchart showing control of an automatic shift controller for a vehicle in a parking state through a start-up of an engine to the vehicle running state according to an embodiment of the present invention.
Figure 2:
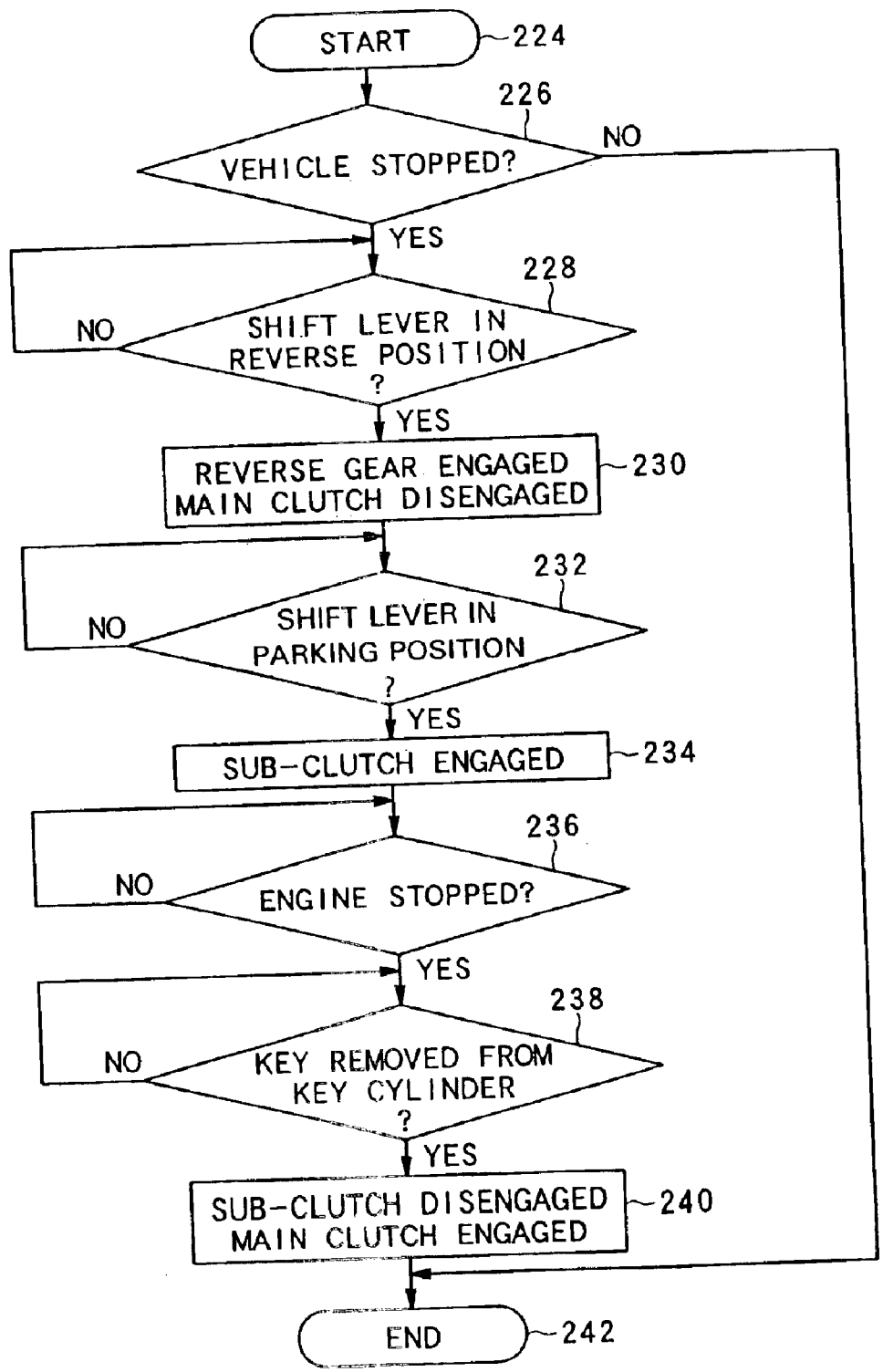
FIG. 2 is a flowchart showing control of the automatic shift controller for the vehicle running state through the engine start-up to the vehicle in the parking state.

An embodiment of the present invention will now be described with reference to the drawings wherein FIGS. 1 and 2 illustrate flowcharts for an embodiment of the present invention.

Figure 5:
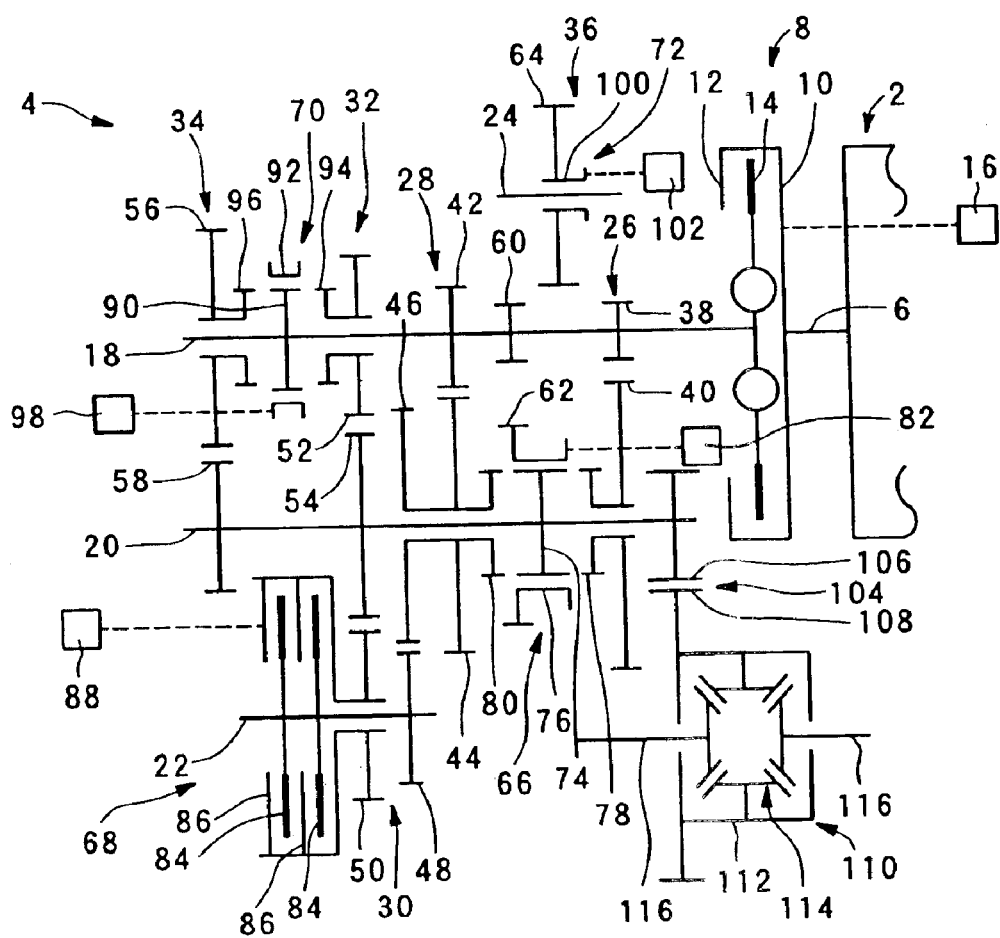
FIG. 5 is a diagram of an automatic transmission.
Figure 7:
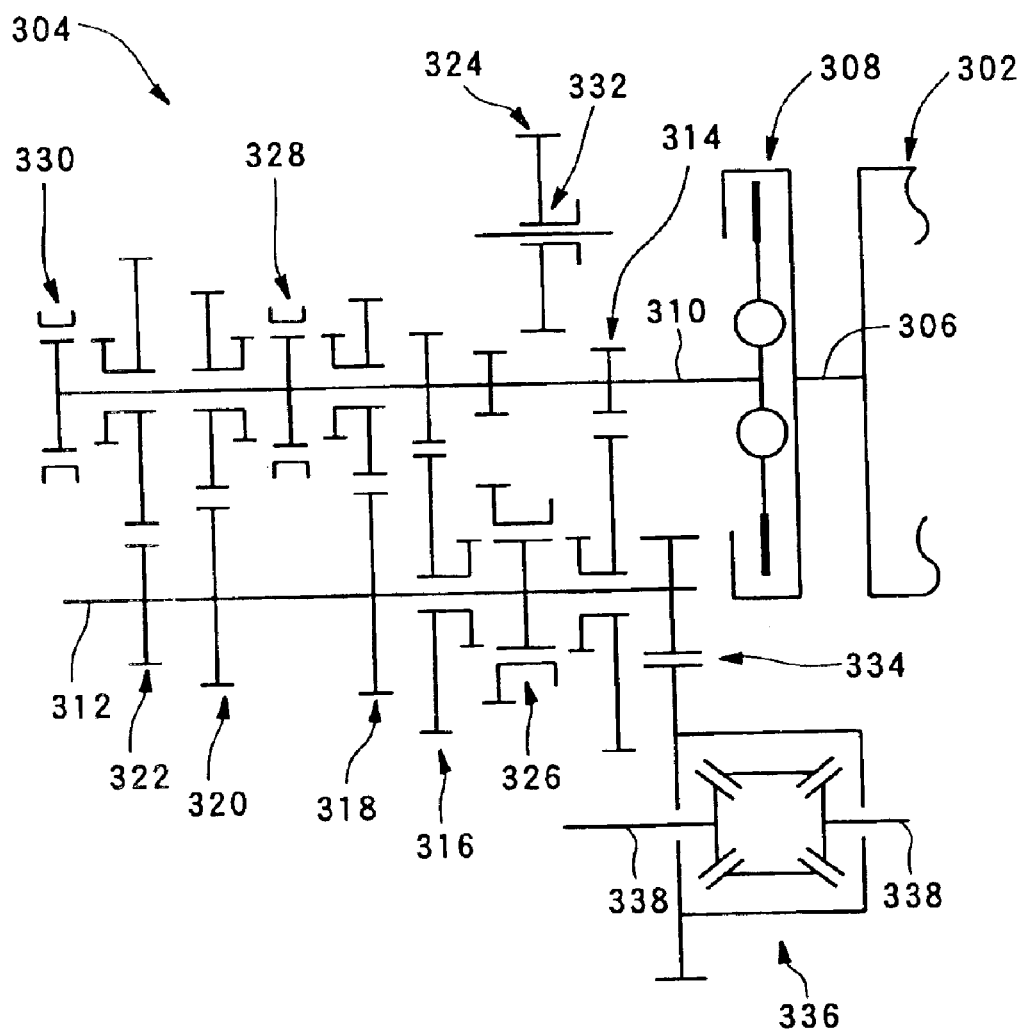
FIG. 7 is a diagram of a conventional automatic transmission.

In FIG. 5, reference numeral 2 designates an engine mounted on a vehicle (not shown) and 4 an automatic transmission. The engine 2 is connected to the automatic transmission 4 through a main clutch 8 at output end of a crankshaft 6. In the main clutch 8, a flywheel 10 in connection with the crankshaft 6 is equipped with a pressure plate 12. A clutch disk 14 is disposed between the flywheel 10 and the pressure plate 12. A main clutch actuator 16 connects and disconnects the main clutch 8 so that the clutch disk 14 is connected to and disconnected from the pressure plate 12.

The automatic transmission 4 includes an input shaft 18 in connection with the engine 2 through the main clutch 8, and an output shaft 20 in connection with drive wheels (not shown). The input shaft 18 is communicated at an input end with the clutch disk 14, while the output shaft 20 is disposed in parallel with the input shaft 18. The automatic transmission 4 includes an intermediate shaft 22, a reverse idler shaft 24, and first through fifth speed gear trains 26, 28, 30, 32, 34 and a reverse gear train 36, with shafts 22, 24 being in parallel with the input and output shafts 18, 20. The gear trains transmit the driving power from the input shaft 18 to the output shaft 20 at different ratios.

The first speed gear train 26 comprises a first speed input gear 38 fixed to the input shaft 18, and a first speed output gear 40 rotatably supported on the output shaft 20 and in mesh with the first speed input gear 38. The second speed gear train 28 comprises a second speed input gear 42 fixed to the input shaft 18, and a second speed output gear 44 rotatably supported on the output shaft 20 and in mesh with the second speed input gear 42.

The third speed gear train 30 comprises a third speed input gear 46, a third speed middle input gear 48, and a third speed middle output gear 50. That is, the third speed input gear 46 is rotatably supported on the output shaft 20 and is integrated to the second speed output gear 44. The third speed middle input gear 48 is fixedly supported on the intermediate shaft 22 in mesh with the third speed input gear 46. The third speed middle output gear 50 is rotatably supported on the intermediate shaft 22 in mesh with a fourth speed output gear 54.

The fourth gear train 32 comprises a fourth speed input gear 52 rotatably supported on the input shaft 18, and the fourth speed output gear 54 fixed to the output shaft 20 is in mesh with the fourth speed gear 52. The fourth speed output gear 54 is also meshed with the third speed middle output gear 50. The fifth speed gear train 34 comprises a fifth speed input gear 56 rotatably supported on the input shaft 18, and a fifth speed output gear 58 fixed to the output shaft 20 is meshed with the fifth speed input gear 56.

The reverse gear train 36 comprises a reverse input gear 60 fixed to the input shaft 18 between the first and second speed input gears 38 and 42, a reverse output gear 62 on a $1^{st}/2^{nd}$ selector sleeve 76 of a $1^{st}/2^{nd}$ gear-shifting mechanism 66, and a reverse idler gear 64 rotatably supported on the reverse idler shaft 24 so as to mesh with and unmesh from the reverse input and output gears 60, 62.

Thus, the input shaft 18 has thereon the first speed input gear 38, the reverse input gear 60, the second speed input gear 42, the fourth speed input gear 52, and the fifth speed input gear 56 in this order from the engine 2 side. The output shaft 20 has thereon the first speed output gear 40, the reverse output gear 62, the second speed output gear 44, the third speed input gear 46, the fourth speed output gear 54, and the fifth speed output gear 58 in this order from the engine 2 side. Also, the intermediate shaft 22 has thereon the third speed middle input and output gears 48, 50.

The gear trains 26, 28, 30, 32, 34 and 36 are switched by the gear-shifting mechanism. Also, the automatic transmission 4 includes as a gear-shifting mechanism, the synchronizing $1^{st}/2^{nd}$ gear-shifting mechanism 66, a secondary or sub-clutch 68, a synchronizing $4^{th}/5^{th}$ gear-shifting mechanism 70, and a reverse gear-shifting mechanism 72. The synchronizing $1^{st}/2^{nd}$ gear-shifting mechanism 66 is disposed on the output shaft 20 between the first and second speed output gears 40, 44. The sub-clutch 68 is disposed on the intermediate shaft 22 having third speed input and output gears 48, 50, and functions as a third speed gear-shifting mechanism. The synchronizing $4^{th}/5^{th}$ gear-shifting mechanism 70 is disposed on the input shaft 18 between the fourth and fifth speed input gears 52, 56. The reverse gear-shifting mechanism 72 is disposed in the reverse idler gear 64.

In the $1^{st}/2^{nd}$ gear-shifting mechanism 66, the $1^{st}/2^{nd}$ selector sleeve 76 is movable axially but non-rotatably mounted on the $1^{st}/2^{nd}$ selector hub 74 which is fixed to the output shaft 20. First and second speed connections 78, 80 are arranged on the first and second speed output gears 40, 44 respectively for selective engagement with shift sleeve 76. The $1^{st}/2^{nd}$ selector sleeve 76 is operated by a $1^{st}/2^{nd}$ selector actuator 82 and is selectively connected with the first or second connection 78, 80 to be engaged with the first or second gear train 26, 28. The reverse output gear 62 is integrated into the $1^{st}/2^{nd}$ selector sleeve 76.

The sub-clutch 68 is engaged or disengaged so that one of the gear trains, other than the first gear train 26 and the reverse gear train 36, is engaged or disengaged. For example, the third gear train 30 is engaged.

The sub-clutch 68 of this embodiment includes clutch disks 84 and pressure plates 86. That is, the clutch disks 84 are positioned on the intermediate shaft 22 to which the third speed middle input gear 48 is fixed. The pressure plates 86 are disposed on the third speed middle output gear 50 which is rotatably supported by the intermediate shaft 22. Plates 86 are positioned alternately with the clutch disks 84. The sub-clutch 68 has the clutch disks 84 connected with or disconnected from the pressure plates 86 by a sub-clutch actuator 88 so that the third gear train 30 is engaged or disengaged.

In the $4^{th}/5^{th}$ gear-shifting mechanism 70, a $4^{th}/5^{th}$ selector sleeve 92 is movable axially but non-rotatably mounted on a $4^{th}/5^{th}$ selector hub 90 which is fixed to the input shaft 18. Fourth and fifth speed connections 94, 96 are arranged on the fourth and fifth speed input gears 52, 56 respectively. The $4^{th}/5^{th}$ selector sleeve 92 is operated (i.e. shifted) by a $4^{th}/5^{th}$ selector actuator 98 so as to be selectively connected with the fourth or fifth speed connection 94, 96 to be engaged with the fourth or fifth gear train 32, 34.

In the reverse gear-shifting mechanism 72, the reverse idler gear 64 has a reverse selector sleeve 100 integrated thereinto. The reverse selector sleeve 100 is operated (i.e. shifted) by a reverse selector actuator 102 so that the reverse idler gear 64 is meshed with or unmeshed from the reverse input and output gears 60, 62 to engage or disengage the reverse gear train 36.

In the automatic transmission 4, a final reduction drive gear 106 is disposed at the end of the output shaft 20 toward the engine. A final reduction driven gear 108 in mesh with the drive gear 106 is positioned in a differential case 112 of a differential 110. In the differential 110, a differential gear train 114 in the case 112 is connected to one end of right and left drive shafts 116. The other end of the drive shafts 116 are connected to drive wheels (not shown).

Figure 4:
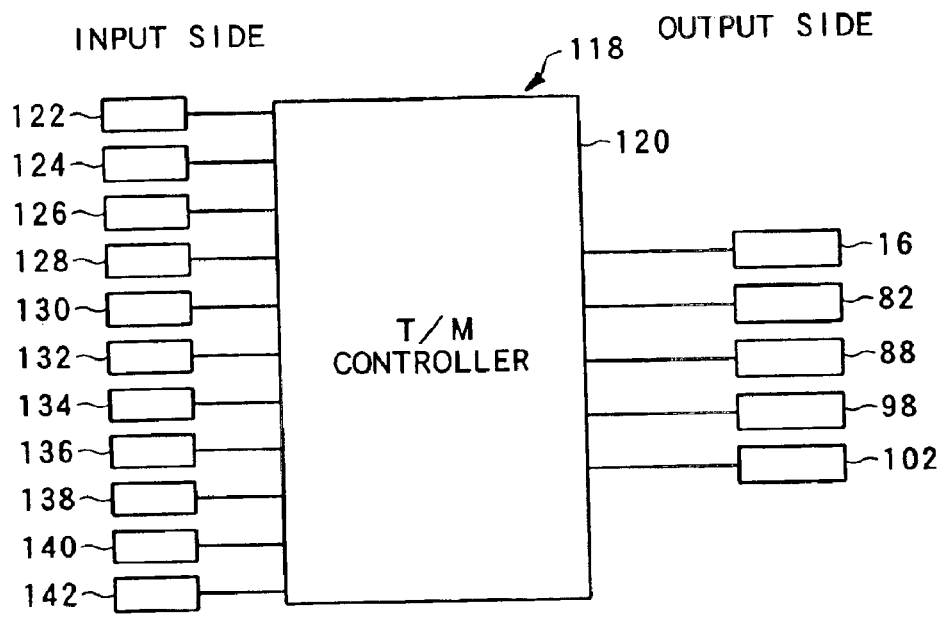
FIG. 4 is a block diagram of the automatic shift controller.

Referring to FIG. 4, in the automatic transmission 4, a control means 120 of an automatic shift controller 118 is connected to the main clutch actuator 16, the $1^{st}/2^{nd}$ selector actuator 82, the sub-clutch actuator 88, the $4^{th}/5^{th}$ selector actuator 98, and the reverse selector actuator 102.

The control means 120 is connected with an accelerator pedal sensor 122 to detect a depressing degree of an accelerator pedal, a brake switch 124 which is turned off when a brake pedal (not shown) is depressed, a speed sensor 126 to detect the vehicle speed, an engine speed sensor 128 to detect the engine speed, a throttle opening sensor 130 to detect an opening degree of a throttle valve (not shown), input and output shafts rotating speed sensors 132, 134 to detect the rotating speeds of the input and output shafts of the automatic transmission 4, a main clutch sensor 136 to detect whether the main clutch 8 is engaged or disengaged, and a shift position sensor 138 to detect the position of the shift lever (not shown) for the automatic transmission 4.

The control means 120 is also connected to a key insertion sensor 140 and a door open sensor 142. That is, the key insertion sensor 140 as a key insertion detector detects whether an ignition key (not shown) is inserted into a key cylinder so as to determine the engine 2 is ready for start-up. The door open sensor 142 as a door open detector detects whether a door on the driver's side (not shown) is opened.

In the automatic shift controller 118, input signals from the sensors 122, 124, 126, 128, 130, 132, 134, 136, 138, 140, and 142 are input to the control means 120 so as to operate the main clutch 8, the $1^{st}/2^{nd}$ selector mechanism 66, the sub-clutch 68, the $4^{th}/5^{th}$ selector mechanism 70, and the reverse selector mechanism 72 via the actuators 16, 82, 88, 98, 102.

When the engine 2 is stopped with vehicle being parked, the automatic shift controller 118 controls the control means 120 so that the reverse gear train 36 is engaged, the main clutch 8 is engaged, and the sub-clutch 68 is disengaged. Also when preparation for engine start-up is started in a parked vehicle, the controller 118 controls the control means 120 so that the reverse gear trains 36 is disengaged, the main clutch 8 is disengaged, and the sub-clutch 68 is engaged. Further, when the shift lever is shifted to the reverse position after engine start-up, the sub-clutch 68 is disengaged.

If the driver's door is opened or the ignition key is inserted into the key cylinder, it is predicted that the driver is about to start up the engine 2. The control means 120 is connected to at least one of the key insertion sensor 140, which detects whether the ignition key is inserted into the key cylinder, and the door open sensor 142, which detects whether the driver's side door is opened. It is determined whether the preparation for engine start-up is started by either one of the key insertion signal from the key insertion sensor 140 and the door open signal from the door open sensor 142.

On the other hand, in the automatic shift controller 118, when the shift lever is shifted to the reverse position while the vehicle is stopped after vehicle running, the control means 120 controls so that the reverse gear train 36 is engaged and the main clutch 8 is disengaged. Also when the shift lever is shifted to a parking position from the reverse position, the disengaged sub-clutch 68 is controlled to be engaged. Further, when the ignition key is removed from the key cylinder after the engine 2 is stopped, the control means 120 controls so that the disengaged main clutch 8 is engaged and the engaged sub-clutch 68 is disengaged.

Next, the operation of this embodiment will be described.

In the engine 2 mounted on the vehicle (not shown), the automatic transmission 4 based on the manual transmission is connected to the engine 2 through the main clutch 8, which transmission is provided with the gear trains 26, 28, 30, 32, 34, 36 and the gear-shifting mechanisms 66, 68, 70, 72.

In the automatic shift controller 118, the control means 120 controls the actuators 16, 82, 88, 98, 102 to operate the gear-shifting mechanisms 66, 68, 70, 72 so that one of the gear trains 26, 28, 30, 32, 34, 36 of the automatic transmission 4 is engaged according to the shift position of the shift lever.

As shown in FIG. 1, the program for the automatic shift controller 118 starts at step 200 when the control of the controller 120 is started while the vehicle is parked. Then a determination is made at step 202 as to whether a parking condition is satisfied.

If the determination at step 202 is "NO", i.e., the shift-lever is not at the parking position, or the engine 2 is not stopped, then the program is ended at step 222. If the determination at step 202 is "YES", i.e., the shift-lever is at the parking position and the engine 2 is stopped, then the reverse gear train 36 is engaged, main clutch 8 is engaged, and the sub-clutch 68 is disengaged at step 204. Then a determination is made at step 206 as to whether the preparation for engine start-up is started.

The determination whether the preparation for engine start-up is started, is determined from the signal from at least one of the key insertion sensor 140 and the door open sensor 142. The key insertion sensor 140 inputs the key insertion signal when it is detected that the ignition key is inserted into the key cylinder, whereas the door open sensor 142 inputs the door open signal when opening of the driver's door is detected.

If the determination at step 206 is "NO", i.e., neither the ignition key signal nor the door open signal is input, then the determination of step 206 is repeated. If the determination is "YES", i.e., at least one of the key insertion signal and the door open signal is input for engine start-up preparation, then the main clutch 8 is disengaged and the sub-clutch 68 is engaged at step 208.

After depressing the brake pedal that turns on the brake switch 124 and the engine 2 is started at step 210, a determination is made at step 212 as to whether the shift lever is shifted to the reverse position.

If the determination at step 212 is "NO", the determination is repeated. If the determination is "YES", then the sub-clutch 68 is disengaged at step 214. Also a determination is made at step 216 as to whether the shift lever is shifted to a neutral position. At step 214, the main clutch 8 is disengaged and the reverse gear train 36 is engaged.

If the determination at step 216 is "No", the determination is repeated. If the determination is "YES", then all of gear trains 26, 28, 30, 32, 34, 36 are disengaged and the main clutch 8 is engaged at step 218. When the shift lever is shifted to a position for running forward such as first-speed and drive positions, the gear engagement is shifted to engagement of the gear trains 26, 28, 30, 32, 34 for running forward at step 220, then the program ends at step 222.

As thus described, when the vehicle is parked and the engine 2 is stopped, the automatic shift controller 118 controls the control means 120 so that the reverse gear train 36 is engaged, the main clutch 8 is engaged, and the sub-clutch 68 is disengaged, as shown in FIG. 3. Also when the preparation for engine start-up is started in a parked vehicle, the controller 118 controls so that the reverse gear train 36 is disengaged, the main clutch 8 is disengaged, and the sub-clutch 68 is engaged.

Thereby, the vehicle can be in the parking state by a "mechanical parking mechanism" which utilizes the stop of the engine 2 with the engagement of the main clutch 8 and the reverse gear train 36, which does not require electric power, such as in an automatic transmission based on the conventional manual transmission. Also, when the engine is preparing for start-up, in which the preparation for engine start-up is predicted by a signal such as the key insert signal or the door open signal, the vehicle can be maintained in the parking state by the engagement of the sub-clutch 68.

Accordingly, due to the automatic shift controller 118, the vehicle with the automatic transmission 4 can be in the parking state without a special parking mechanism even during preparation for start-up of the engine.

Further, the automatic shift controller 118 controls the sub-clutch 68 to be disconnected after the engine 2 is started and the shift lever is shifted to the reverse position.

Accordingly, without a special parking mechanism, the vehicle can be in the parking state by the engagement of the reverse gear train 36 not only during preparation for start-up but also after the engine 2 is started.

Therefore, the automatic shift controller 118 can prevent the problem in startability of the engine 2 and the automatic transmission 4 can be maintained in the parking state after the engine 2 is started, which realizes a performance corresponding to an automatic transmission with a torque converter.

Still further, the automatic transmission 4 is in the parking state by the engagement of the sub-clutch 68 and the third-speed gear train 30. In the event a double-mesh state happens by malfunction, it is due to the engagement of the main clutch 8, so that torque is not produced more than torque capacity of the sub-clutch 68 to avoid gear damage by slip of the sub-clutch 68.

Now referring to FIG. 2, a program for the control means 120 of the automatic shift controller 118 starts at step 224 when the vehicle is running. A determination is made at step 226 whether the vehicle is stopped.

If the determination at step 226 is "NO", i.e., the vehicle is running, then the program is ended at step 242. If the determination is "YES", then a determination is made at step 228 whether the shift lever is shifted from the drive position through the neutral position to the reverse position. Incidentally, when the shift lever is in the neutral position, all of the gear trains 26, 28, 30, 32, 34, 36 are disengaged, the main clutch 8 is engaged, and the sub-clutch 68 is disengaged.

If the determination at step 228 is "NO", the determination is repeated. If the determination is "YES", then the reverse gear train 36 is engaged and the main clutch 8 is disengaged at step 230. A determination is made at step 232 whether the shift lever is in the parking position.

If the determination at step 232 is "NO", the determination is repeated. If the determination is "YES", then the disengaged sub-clutch 68 is engaged and a determination is made at step 236 whether the engine 2 is stopped.

If the determination at step 236 is "NO", the determination is repeated. If the determination is "YES", then a determination is made at step 238 whether the ignition key is removed from the key cylinder.

If the determination at step 238 is "NO", the determination is repeated. If the determination is "YES", then the disengaged main clutch 8 is engaged and the engaged sub-clutch 68 is disengaged. The reverse gear train 36 has been engaged at step at 230.

As thus described, as shown in FIG. 3, when the vehicle is stopped after running and the shift lever is shifted to the reverse position, the control means 120 controls so as to engage the reverse gear train 36 and to disengage the main clutch 8. When the shift lever is shifted to the parking position from the reverse position, the disengaged sub-clutch 68 is engaged.

Thereby, without requiring any special parking mechanism, the automatic shift controller 118 permits the transmission 4 to be smoothly engaged in the parking state, when the vehicle is stopped after running, and then is parked.

Also, when the engine 2 is stopped and the ignition key is removed from the key cylinder, the automatic shift controller 118 controls so that the disengaged main clutch 8 is engaged and engaged sub-clutch 68 is disengaged.

The present invention is not limited to the above, but is susceptible to various variations or modifications.

For example, the control means 120 of the automatic shift controller 118 controls the sub-clutch 68 to be engaged when the vehicle is stopped and the shift lever is in the first-speed or the drive position and then the vehicle moves backward. Also, the control means 120 controls the sub-clutch 68 to be engaged when the vehicle is stopped and the shift lever is in the reverse position and then the vehicle moves forward.

Accordingly, the automatic shift controller 118 prevents the vehicle from moving in an opposite direction to a traveling direction when the vehicle starts on an uphill road, without a special hill start aid.

Further, when the sub-clutch 68 is engaged at vehicle starting on the uphill road, the control means 120 of the automatic shift controller 118 controls the sub-clutch 68 to be disengaged according to the degree of depression of the accelerator pedal and the engaging state of the main clutch 8. The vehicle can easily be started on the ground while preventing the vehicle from moving in the opposite direction to the traveling direction. To cancel the parking state while the vehicle is parked on the uphill road, the parking state is cancelled without excess force such as in a parking mechanism of a conventional automatic transmission, thereby providing superior operability.

Still further, in the above embodiment, the vehicle can be in the parking state while utilizing the stop of the engine 2 with the engagement of the reverse gear train 36 and the main clutch 8 when the vehicle is parked. However, the vehicle also can be in the parking state while utilizing the engine stop with the engagement of two gear trains of different gear ratios, e.g., the first-speed gear train 26 and the third-speed gear train 30.

That is, when the first and third gear trains 26, 30 are engaged, the input and output shafts 18, 20 become in a double mesh state. Due to the different rotating speed in two transmitted force paths between the input and output shafts 18, 20 having different ratios, the output shaft 20 interferes with the input shaft 18, creating a stopping force so that the automatic transmission 4 is in the parking state.

Moreover, when the vehicle is parked, the vehicle can be in the parking state while utilizing the stop of the automatic transmission 4 with the engagement of the two gear trains for forward and backward, e.g., first-speed gear train 26 and the reverse gear train 36.

In such a case, the input and output shafts 18, 20 are in the double mesh state, and the rotating direction of the force transmitted from the input shaft 18 to the output shaft 20 is opposite, so that the output shaft 20 is in interference with the input shaft 18. This produces the stopping force and causes the automatic transmission 4 to be in the parking state.

As thus described, in the automatic shift controller, when the vehicle is parked, the vehicle can be in a parking state by a mechanical parking mechanism which utilizes the stop of the engine 2 with the engagement of the main clutch 8 and of the reverse gear train, which does not require electric power, as in the automatic transmission based on the conventional manual transmission. During the preparation for the engine start-up, the vehicle can be maintained in the parking state by the engagement of the sub-clutch 68. Accordingly, the vehicle can be in the parking state without a special parking mechanism even during preparation for start-up of the engine.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. An automatic shift transmission for a vehicle having an engine mounted on the vehicle, an input shaft in connection with the engine through a main clutch; an output shaft in connection with a drive wheel, a plurality of gear trains to transmit the driving power from said input shaft to said output shaft at different ratios, and a gear-shifting mechanism which shifts said gear trains, a controller for controlling said shift mechanism so that one of said gear trains is engaged according to a position of a shift lever, comprising:

a sub-clutch that engages and disengages so that one of said gear trains, other than a first-speed gear train and a reverse gear train, is engaged or disengaged, and the controller controls so that 1) when said vehicle is parked, said reverse gear is engaged, said main clutch is engaged, and said sub-clutch is disengaged, and so that 2) when preparation for engine start-up is commenced when the vehicle is parked, then said main clutch is disengaged and said sub-clutch is engaged.

2. An automatic shift transmission for a vehicle defined in claim 1, wherein said controller is connected to at least one of a key insertion sensor, and a door open sensor, said key insertion sensor detecting whether an ignition key is inserted into a key cylinder, said door open sensor detecting whether a driver's side door is open, and wherein said preparation for engine start-up is determined from a signal resulting from said key insertion sensor or said door open sensor.

3. An automatic shift transmission for a vehicle having an engine mounted on the vehicle, an input shaft in connection with the engine through a main clutch, an output shaft in connection with a drive wheel, a plurality of gear trains to transmit the driving power from said input shaft to said output shaft at different ratios, and a gear-shifting mechanism which shifts said gear trains, a controller for controlling said shift mechanism so that one of said gear trains is engaged according to a position of a shift lever, comprising:

a sub-clutch that engages and disengages so that one of said gear trains, other than a first-speed gear train and a reverse gear train, is engaged or disengaged, and the controller controls so that 1) when said vehicle is parked, then said reverse gear is engaged, said main clutch is engaged, and said sub-clutch is disengaged, so that 2) when preparation for engine start-up is commenced when the vehicle is parked, then said main clutch is disengaged and said sub-clutch is engaged, and so that 3) when said engine is started and the shift lever is shifted into a reverse position, then said sub-clutch is disengaged.

4. An automatic shift transmission for a vehicle defined in claim 3, wherein said controller is connected to a key insertion sensor, said key insertion sensor detecting whether an ignition key is inserted into a key cylinder, and wherein said preparation for engine start-up is determined from a signal resulting from said key insertion sensor.

5. An automatic shift transmission for a vehicle defined in claim 3, wherein said controller is connected to a door open sensor, said door open sensor detecting whether a driver's door is open, and wherein said preparation for engine start-up is determined from a signal resulting from said door open sensor.

6. An automatic shift transmission for a vehicle having an engine mounted on the vehicle, an input shaft in connection with the engine through a main clutch, an output shaft in connection with a drive wheel, a plurality of gear trains to transmit the driving power from said input shaft to said output shaft at different ratios, and a gear-shifting mechanism which shifts said gear trains, a controller for controlling said shift mechanism so that one of said gear trains is engaged according to a position of a shift lever, comprising:

a sub-clutch that engages and disengages so that one of said gear trains, other than a first-speed gear train and a reverse gear train, is engaged or disengaged, and the controller controls so that 1) when said vehicle is stopped after running and said shift lever is shifted into a reverse position, then said reverse gear train is engaged and said main clutch is disengaged, and so that 2) when said shift lever is shifted into a parking position from the reverse position, then said disengaged sub-clutch is engaged.

7. An automatic shift transmission for a vehicle defined in claim 6, wherein said controller controls so that when said engine is stopped and an ignition key is removed from a key cylinder, then said disengaged main clutch is engaged and said engaged sub-clutch is disengaged.

8. An automatic shift transmission for a vehicle having an engine mounted on the vehicle, an input shaft in connection with the engine through a main clutch, an output shaft in connection with a drive wheel, a plurality of gear trains to transmit the driving power from said input shaft to said output shaft at different ratios, and a gear-shifting mechanism which shifts said gear trains, a controller for controlling said shift mechanism so that one of said gear trains is engaged according to a position of a shift lever, comprising:

a sub-clutch that engages and disengages so that one of said gear trains, other than a first-speed gear train and a reverse gear train, is engaged or disengaged; and the controller controls so that 1) when said vehicle is stopped and said shift lever is shifted to a position to move forward and said vehicle moves backward, then said sub-clutch is engaged, and so that 2) when said vehicle is stopped and said shift lever is shifted to the reverse position and said vehicle moves forward, then said sub-clutch is engaged.

* * * * *